(12) United States Patent
Troegel et al.

(10) Patent No.: US 10,629,895 B2
(45) Date of Patent: Apr. 21, 2020

(54) SI/G/C-COMPOSITES FOR LITHIUM-ION-BATTERIES

(71) Applicant: Wacker Chemie AG, Munich (DE)

(72) Inventors: Dennis Troegel, Ottensoos (DE); Peter Gigler, Dachau (DE); Eckhard Hanelt, Geltendorf (DE); Stefan Haufe, Neubiberg (DE)

(73) Assignee: WACKER CHEMIE AG, Munich (DE)

( * ) Notice: Subject to any disclaimer, the term of this patent is extended or adjusted under 35 U.S.C. 154(b) by 236 days.

(21) Appl. No.: 15/116,522

(22) PCT Filed: Jan. 23, 2015

(86) PCT No.: PCT/EP2015/051324
§ 371 (c)(1),
(2) Date: Aug. 4, 2016

(87) PCT Pub. No.: WO2015/117838
PCT Pub. Date: Aug. 13, 2015

(65) Prior Publication Data
US 2016/0365567 A1 Dec. 15, 2016

(30) Foreign Application Priority Data
Feb. 6, 2014 (DE) .......... 10 2014 202 156

(51) Int. Cl.
*H01M 4/133* (2010.01)
*H01M 4/134* (2010.01)
(Continued)

(52) U.S. Cl.
CPC .......... *H01M 4/364* (2013.01); *C04B 35/524* (2013.01); *C04B 35/64* (2013.01); *H01M 4/133* (2013.01);
(Continued)

(58) Field of Classification Search
CPC ...... H01M 4/133; H01M 4/134; H01M 4/364; H01M 4/38; H01M 4/382; H01M 4/386;
(Continued)

(56) References Cited

U.S. PATENT DOCUMENTS 6,589,696 B2 * 7/2003 Matsubara ............ H01M 2/32
429/218.1
8,124,279 B2 2/2012 Petrat et al.
(Continued)

FOREIGN PATENT DOCUMENTS

CA 2752844 A1 3/2013
CN 1884056 A 12/2006
(Continued)

OTHER PUBLICATIONS

English language abstract for CN 101210112 A (2008).
(Continued)

*Primary Examiner* — Brittany L Raymond
(74) *Attorney, Agent, or Firm* — Caesar Rivise, PC

(57) ABSTRACT

The invention relates to silicon/graphite/carbon composites (Si/G/C-composites), containing graphite (G) and non-aggregated, nanoscale silicon particles (Si), wherein the silicon particles are embedded in a carbon matrix (C). The invention also relates to a method for producing said type of composite, electrode material for lithium ion batteries containing said type of composite and to a lithium ion battery.

18 Claims, 4 Drawing Sheets

(51) Int. Cl.

| | | |
|---|---|---|
| *H01M 4/36* | (2006.01) | |
| *H01M 4/38* | (2006.01) | |
| *H01M 4/587* | (2010.01) | |
| *H01M 10/0525* | (2010.01) | |
| *C04B 35/524* | (2006.01) | |
| *C04B 35/64* | (2006.01) | |
| *C01B 32/20* | (2017.01) | |
| *C01B 32/05* | (2017.01) | |

(52) U.S. Cl.
CPC ........... *H01M 4/134* (2013.01); *H01M 4/382* (2013.01); *H01M 4/386* (2013.01); *H01M 4/587* (2013.01); *H01M 10/0525* (2013.01); *C01B 32/05* (2017.08); *C01B 32/20* (2017.08); *C04B 2235/422* (2013.01); *C04B 2235/425* (2013.01); *C04B 2235/428* (2013.01); *H01M 4/38* (2013.01)

(58) Field of Classification Search
CPC .............. H01M 4/587; H01M 10/0525; C04B 2235/422; C04B 2235/425; C04B 2235/428; C04B 35/524; C04B 35/64
See application file for complete search history.

(56) References Cited

U.S. PATENT DOCUMENTS

| | | | |
|---|---|---|---|
| 2002/0164479 A1* | 11/2002 | Matsubara | H01M 4/362 428/367 |
| 2003/0215711 A1 | 11/2003 | Aramata et al. | |
| 2004/0137327 A1 | 7/2004 | Gross et al. | |
| 2005/0136330 A1 | 6/2005 | Mao et al. | |
| 2010/0273058 A1 | 10/2010 | Lee et al. | |
| 2011/0281180 A1 | 11/2011 | Kim et al. | |
| 2011/0311873 A1 | 12/2011 | Schulz et al. | |
| 2012/0156493 A1 | 6/2012 | Maisels et al. | |
| 2013/0252093 A1* | 9/2013 | Yokomizo | H01M 4/133 429/211 |
| 2013/0302675 A1 | 11/2013 | Kouzu et al. | |
| 2014/0147751 A1 | 5/2014 | Yang et al. | |
| 2014/0234722 A1 | 8/2014 | Kyotani et al. | |
| 2014/0287315 A1 | 9/2014 | Troegel et al. | |
| 2014/0342232 A1* | 11/2014 | Scharfegger | H01M 4/0471 429/231.4 |

FOREIGN PATENT DOCUMENTS

| | | |
|---|---|---|
| CN | 101210112 A | 7/2008 |
| CN | 102332571 A | 1/2012 |
| CN | 102376944 A | 3/2012 |
| CN | 102544445 A | 7/2012 |
| DE | 102009033739 A1 | 1/2011 |
| DE | 112012001289 T5 | 12/2013 |
| EP | 1363341 A2 | 11/2003 |
| EP | 1730800 B1 | 5/2008 |
| EP | 2387089 A1 | 11/2011 |
| EP | 2573845 A1 | 3/2013 |
| EP | 1702375 B1 | 4/2013 |
| EP | 2782167 A1 | 9/2014 |
| JP | 2000272911 A | 10/2000 |
| KR | 20070113066 A | 11/2007 |
| KR | 20130107892 A | 10/2013 |
| WO | 2010006763 A1 | 1/2010 |
| WO | 2013031993 A1 | 3/2013 |
| WO | 2013130712 A1 | 9/2013 |

OTHER PUBLICATIONS

Kasavajjula et al., "Nano- and bulk-silicon-based insertion anodes for lithium-ion secondary cells." Journal of Power Sources 163.2 (2007): 1003-1039.

Khomenko et al. "Lithium-ion batteries based on carbon-silicon-graphite composite anodes." Journal of Power Sources 165.2 (2007): 598-608.

Terranova et al. "Si/C hybrid nanostructures for Li-ion anodes: An overview." Journal of Power Sources 246 (2014): 167-177.

International Search Report from PCT/EP2015/051324 dated Jun. 5, 2015.

English Abstract for JP 2000272911 A (2000).

English Abstract for KR 20130107892 A (2013).

English Abstract of CN 1884056 A (2006).

English Abstract of CN 102332571 A (2012).

English Abstract of CN 102376944 A (2012).

English Abstract of CN 1025444415 A (2012).

Xi et al. (2005). Composite polymer electrolyte doped with mesoporous silica SBA-15 for lithium polymer battery. Solid State Ionics, 176, 1249-1260.

\* cited by examiner

SI/G/C-COMPOSITES FOR LITHIUM-ION-BATTERIES

BACKGROUND OF THE INVENTION

The invention relates to silicon/graphite/carbon composites (Si/G/C composites), to a method for producing them, and to their use as electrode active material in lithium ion batteries.

Rechargeable lithium ion batteries are presently the commercialized electrochemical energy storage devices with the highest energy densities, of up to 250 Wh/kg. They are utilized especially in the sector of portable electronics, for tools, and also for means of transport, such as bicycles or automobiles, for example. Especially for application in automobiles, however, it is necessary to achieve further significant increase in the energy density of the batteries, in order to obtain longer ranges for the vehicles.

Used in particular as negative electrode material ("anode") is graphitic carbon. Features of the graphitic carbon are its stable cycling properties and its decidedly high handling safety, in comparison to lithium metal which is used in lithium primary cells. A key argument in favor of the use of graphitic carbon in negative electrode materials lies in the small volume changes of the host material that are associated with the intercalation and deintercalation of lithium, i.e., the electrode remains approximately stable. For instance, for the intercalation of lithium in graphitic carbon, a volume increase of only about 10% is measured for the limiting stoichiometry of $LiC_6$. A disadvantage, however, is its relatively low electrochemical capacity of in theory 372 mAh/g, which is only about one tenth of the electrochemical capacity theoretically achievable with lithium metal.

In anodes for lithium ion batteries where the electrode active material is based on silicon (as the material with the highest known storage capacity for lithium ions; 4199 mAh/g), the silicon may experience an extreme change in volume of up to about 300% on charging and/or discharging with lithium. As a result of this change in volume there is a severe mechanical stress on the active material and on the electrode structure as a whole, leading, through electrochemical milling, to a loss of electrical contacting and hence to the destruction of the electrode, with accompanying loss of capacity. Moreover, the surface of the silicon anode material used reacts with constituents of the electrolyte, accompanied by continuous formation of passivating protective layers (solid electrolyte interface; SEI), leading to an irreversible loss of mobile lithium.

In order to solve the problem of the severe volume expansion of the active material and of the formation of SEI in Si-containing anodes, the last decade has seen a variety of approaches toward electrochemical stabilization of Si-containing electrode active materials (an overview is given by A. J. Appleby et al., *J. Power Sources* 2007, 163, 1003-1039).

One possible solution is to use the silicon-containing active material not in pure form, but instead in combination with carbon. In this case it is possible on the one hand to insert the Si-containing active material in the form of a physical mixture with graphite into the electrode coating (cf. EP 1730800 B1), or to combine the two elements, silicon and carbon, structurally in the form of a composite material (an overview is given by M. Rossi et al., *J. Power Sources* 2014, 246, 167-177).

Graphite and structurally related carbons are relatively soft, have very good electrical conductivity, possess a low mass, and feature a low change in volume when charging/discharging. For these reasons, carbon-based anodes, as is known, have a very good electrochemical stability of several hundred cycles. By combination of the advantages of the two elements (silicon (Si) with high capacity, graphite (G) and/or amorphous carbon (C) with high stability), electrode active materials based on Si/C or Si/G/C composites possess a more stable cycling behavior than the pure silicon, with a capacity increased by comparison with that of pure graphite.

Composites of this kind can be produced, according to EP 1363341 A2, by chemical vapor deposition of carbon on silicon.

Also known is the production of Si/C composites by reactive milling of silicon with carbon or carbon precursors, and subsequent carbonization; see, for example, US 20040137327 A1.

The embedding of silicon particles into an organic C precursor matrix with subsequent carbonization also leads to Si/C or Si/G/C composites; see, for example, US 20050136330 A1. C precursors contemplated here are primarily hydrocarbons, carbohydrates, and a multiplicity of polymers, leading, according to their composition and structure, to graphitizable (soft) or nongraphitizable (hard) carbons.

A distinction is made below between composites which comprise only nanoscale silicon, embedded in an amorphous carbon matrix (Si/C composites), and materials which additionally include one or more crystalline graphite cores within an Si/C shell (Si/G/C composites). In a variety of disclosures, the graphite content in particular has had beneficial consequences for the conductivity and structural stability; cf., e.g., EP 2573845 A1.

Another distinction made in this invention is between whether nanoscale silicon is present in the surrounding C matrix in the form of "aggregates" (i.e., nanoscale primary particles are intergrown firmly with one another, via sinter necks, for example, and can no longer be separated from one another), or in the form of nonaggregated, isolated individual particles, which may optionally form loose particle assemblies ("agglomerates").

Si/C composites containing aggregated Si nanoparticles are described for example in WO 2013031993 A1, where production takes place via a C coating of an aggregated Si starting material.

Also known are Si/C composites with nonaggregated silicon. The use of a nonaggregated nanoscale silicon powder in the polycondensation of mono- and/or polyhydroxyaromatic compounds with an aldehyde, in the presence of a catalyst, and subsequent carbonization for the production of nanostructured Si/C composites, is described in WO 2010006763 A1.

CA 2752844 A1 discloses a method for the C coating of Si and SiOx particles, where the composite particles obtained include a high fraction of at least 50% of the embedded nanoscale Si particles in nonaggregated or nonsintered form. A disadvantage of the Si/C composites specified here is that they contain no graphite for improving the conductivity and structural stability. Moreover, the C contents described are very low (<30%), and so, while the C coating does improve the conductivity of the silicon surface, it possesses no stabilizing effect in relation to the volume expansion of the silicon particles.

Si/G/C composites as claimed in US 20130302675 A1 include a (porous) graphite core and Si particles aggregated on the surface, these particles having a coating of amorphous carbon. One possible drawback of this composite is that it has only a little amorphous carbon (1-10%) between the Si particles, thus ruling out the possibility of ensuring adequate stability by buffering the change in volume of the silicon. Moreover, the composites described in US 20130302675 A1 contain only very low silicon levels of approximately 5% and hence contain electrochemical capacities which are only just above those of graphite (~400 mAh/g) and are not relevant for the majority of target applications.

CN 101210112 A describes how the aggregation of the Si particles is reduced by embedment into an organic polymer coating on a graphite core (but the coating there is not carbonized to inorganic carbon, harboring possible drawbacks in respect of conductivity and mechanical strength). It has been found that these structures are disadvantageous in terms of conductivity and mechanical strength.

DESCRIPTION OF THE INVENTION

It was an object of the present invention to provide an electrode active material based on a silicon/carbon composite that exhibits a high reversible capacity of at least 1000 mAh/g, is characterized by more stable cycling behavior than comparable known composites, and more effectively utilizes the high electrochemical capacity provided by the silicon particles.

This object is achieved by an Si/G/C composite comprising graphite (G) and nonaggregated, nanoscale silicon particles (Si), the silicon particles being embedded in an amorphous carbon matrix (C).

For the purposes of the invention, silicon particles that are nonaggregated means that they are in the form of isolated individual particles but that possibly loose particle assemblies ("agglomerates") may form. Aggregates, on the other hand, are primary particles intergrown with one another via sinter necks, for example, which are no longer separable from one another.

The use of nanoaggregated nanoscale Si particles reduces the absolute volume expansion of the silicon on charging (or distributed uniformly over the active material), in order to prevent mechanical destruction of the active material and also of the electrode structure, with losses in capacity, over a number of charging and discharging cycles.

Aggregated Si nanoparticles which have covalent bonds between the individual particles have poorer mechanical stability than individual nonaggregated particles, since these bonds are preferentially breakage points.

In the event of failure, these breakage points may lead to a loss of electrical contacting.

Isolated or individual nonaggregated particles embedded uniformly in a C matrix have no preferential breakage points from the outset, and therefore remain fully electrically contacted on the surface, thus improving the utilization of the electrochemical capacity of the silicon.

The carbon surrounding the silicon particles protects the surface from reactions with other constituents of the electrode and/or of the battery cell, and so reduces the lithium losses caused by such reactions.

The result is an Si/G/C composite material which in comparison to a composite comprising aggregated silicon particles or to a physical mixture with similar composition is distinguished by a significantly improved electrochemical performance.

A further advantage of these composite materials is that in the production of electrodes of lithium ion batteries, they can be processed with considerably greater ease than can pure nanoscale silicon particles.

The invention preferably envisages a composite structure in which there are one or more graphite cores provided with an amorphous carbon layer which contains embedded, nanoscale silicon particles in nonaggregated form.

Through the invention it is possible to combine the known advantages of the graphite component (high conductivity and structural stability) and nonaggregated nanoscale silicon particles (large capacity).

Surprisingly it has been found that Si/G/C composites comprising nonaggregated silicon particles are distinguished by a comparatively high level of capacity utilization, in the order of magnitude >90%.

The use of nanoscale Si particles, moreover, improves the mechanical stability of the active material during charging and discharging.

As a result of the state of nonaggregation, the Si particles are present more uniformly dispersed in the C matrix and are consistently electrochemically contacted; moreover, there are no weak connections between aggregated particles that might act as preferential breakage points and so might lead to a loss of electrical contacting.

The active materials can be produced and processed with high reproducibility and with homogeneous distribution of the components.

The overall result is therefore a new Si/G/C composite material having improved electrochemical cycling stability and capacity utilization.

The Si/G/C composite material is produced by embedding an Si-containing active material (Si) together with graphite (G) into an organic carbon precursor (P), in a first step, and then thermally treating this Si/G/C precomposite, in a second step, in such a way that the precursor (P) is converted into amorphous carbon (C).

The silicon-containing active material (Si) used for producing the Si/G/C composite in accordance with the present invention may be elemental silicon, a silicon oxide, or a silicon/metal alloy. Preference is given to elemental silicon, since it has the greatest storage capacity for lithium ions.

The silicon-containing active material is used preferably in particulate form, which may be submicron-scale or nanoscale.

The Si-containing active material preferably comprises nonaggregated nanoscale silicon particles. Round or splinter-shaped particles are particularly preferred. The Si particles may be present in isolated or agglomerated form, but not as aggregates, in the composite structure. More preferably the Si particles are in isolated form.

Particular preference for use in Li ion batteries is an Si-containing active material which is present in particle form I-IV according to DIN ISO 3435, which subdivides bulk goods into six different particle forms according to the nature of the particle edges.

Particularly preferred are nanoscale Si particles having an average particle size <400 nm, more preferably <200 nm, which may be crystalline or amorphous, with crystalline particles being particularly preferred in the context of this invention.

The Si-containing active material in the Si/G/C composite may also be present in linear form with fiber structure or in the form of Si-containing films or coatings.

The silicon-containing active material may consist of high-purity polysilicon, or alternatively of metallurgical silicon, which may contain elemental impurities such as O, C, N, Fe, Al, Ca, for example.

The silicon-containing active material may also have a thin oxide layer, formed naturally by surface oxidation by means of air contact (native oxide; ≤10 nm) or may have been specifically passivated by chemical oxidation (e.g., by reaction with $H_2O_2$), these oxide layers preferably being thin.

In order to improve the electronic conductivity, the silicon-containing active material may have been deliberately doped with substances such as boron, phosphorus, or arsenic.

Furthermore, it may be present in alloyed form with other metals and elements, in the form of silicides, e.g., with metals such as Li, Sn, Ca, Co, Ni, Cu, Cr, Ti, Al, Fe, and so on. These alloys may be binary, ternary, or multinary. To increase the electrochemical storage capacity, a particularly low level of extraneous elements is preferred.

The silicon-containing active material used may have surface chemical modification by chance, as part of the process, or else by deliberate manipulation. Possible typical surface functionalities include the following: Si—H, Si—Cl, Si—OH, Si—Oalkyl, Si—Oaryl, Si-alkyl, Si-aryl, Si—Osilyl. Particularly preferred are surface groups which are able to attach physically or chemically to the particular carbon precursor (P) used (in particular, e.g., Si—OH, Si—$(CH_2)_n$NR$_2$, Si—$(CH_2)_n$OCH$_2$CH(O)CH$_2$, Si—$(CH_2)_n$OH, Si—$C_6H_4$OH, Si—$(CH_2)_n$CN, Si—$(CH_2)_n$NCO etc. with n=1-10). The attachment surface groups may contain the functional groups and may alternatively be monomeric or polymeric. They may also be attached only to one or to two or more molecule chains on the Si surface.

Besides the Si-containing active material, graphite (G) as well, as a further active material, is present in the Si/G/C composite material of the invention.

This graphite may be a natural or a synthetically produced graphite, the synthetically produced graphite being preferred. The graphite may be entirely crystalline or else semicrystalline with amorphous constituents of up to 90%, preference being given to a crystalline fraction >50%. The graphite may take the form of thin flakes or round particles. Graphene as well may be present as a nanoscale graphite component in the composite.

Besides the Si-containing active material and graphite, there may be further active materials, in the form of particles with coatings, in the Si/G/C composite materials of the invention. These further active materials may consist of a carbon modification such as, for example, (conductive) carbon black, amorphous carbon, pyrolytic carbon, soft carbon, hard carbon, carbon nanotubes (CNTs), fullerenes, or of another active material, such as, for example, Li, Sn, Mg, Ag, Co, Ni, Zn, Cu, Ti, B, Sb, Al, Pb, Ge, Bi, rare earths, or combinations thereof. Preferred further active materials are conductive carbon black and carbon nanotubes and also Li and Sn, which may also be present as an alloy with Si. Additionally there may be further components in the composite, based on an inactive material on the basis of metals (e.g., copper), oxides, carbides, or nitrides, which are known to fulfill structural functions in the composite structure and are therefore able to exert a positive influence over the electrochemical stability.

As carbon precursors (P) there are various compounds and groups of substances that may be incorporated into the composite, either as a mixture or separately in succession. Particularly advantageous precursors are those which have a high C content and which, when converted thermally into carbon, generate conductive structures in a high yield.

Preferred precursors are as follows: elemental carbon (especially carbon blacks, graphites, charcoals, cokes, carbon fibers, fullerenes, graphene, etc.), simple hydrocarbons, (e.g. methane, ethane, ethylene, acetylene, propane, propylene, butane, butene, pentane, isobutane, hexane, benzene, toluene, styrene, ethylbenzene, diphenylmethane, naphthalene, phenol, cresol, nitrobenzene, chlorobenzene, pyridine, anthracene, phenanthrene, etc), polyaromatic hydrocarbons and hydrocarbon mixtures (especially pitches and tars: mesogenic pitch, mesophase pitch, petroleum pitch, hard coal tar pitch, etc.), organic acids (especially citric acid), alcohols (especially ethanol, propanol, furfuryl alcohol etc.), carbohydrates (especially glucose, sucrose, lactose, cellulose, starch, including mono-, oligo-, and polysaccharides), organic polymers (especially epoxy resins, phenol-formaldehyde resin, resorcinol-formaldehyde resin, lignin, tannin, polyethylene, polystyrene, polyvinyl chloride, polyvinylidene chloride, polyvinylidene fluoride, polytetrafluorethylene, polyvinyl acetate, polyvinyl alcohol, polyethylene oxide, polyacrylonitrile, polyaniline, polybenzimidazole, polydopamine, polypyrrole, poly-para-phenylene), silicones.

Particularly preferred precursors are organic polymers and pitches. Especially preferred precursors are organic polymers, more particularly resorcinol-formaldehyde resin, lignin, and polyacrylonitrile.

The carbon precursors can be present as a mixture, in molecularly linked form (e.g., copolymers), or else in phase-separated form alongside one another in the composite structure.

Production of an Si/G/P Precomposite

The Si/G/P material is produced by coating of the silicon-containing active material (Si) and graphite (G) with carbon precursors (P), or by embedding of the silicon-containing active material and the graphite into a precursor-containing matrix.

The silicon-containing active material and graphite here may be introduced together or in succession into the respective operations. Together with the carbon precursor, the silicon-containing active material and the graphite may be subjected to high-energy milling (dry or with water and/or organic solvent) or may otherwise be physically mixed in any form.

Furthermore, the silicon-containing active material and graphite may be dispersed into a dispersion, solution, or melt of the carbon precursor, and coated with the precursor or embedded into the precursor by subsequent removal of the solvent. The removal of the solvent may be accomplished, for example, under reduced pressure, by spray (drying) methods, or by precipitation of the Si/G/precursor precomposite, and subsequent filtration, and also centrifugation.

The processes in liquid phase are preferred, since there it is possible to achieve the best distribution of silicon and graphite in the C precursor.

In one particularly preferred embodiment, the Si-containing active material and graphite are dispersed together into a solution of one or more precursor monomers, and the monomers are polymerized in solution to form the precursor (P) in such a way that the Si-containing active material and graphite are embedded completely into the precursor matrix. Further reaction may take place with the resultant Si/G/P precomposites in moist or dried form. Additionally, prior to further processing, the intermediates may be subsequently comminuted or subjected to coating/embedding with further C precursors.

Another possibility is to deposit silicon nanoparticles from the gas phase on graphite, via CVD and/or TVD operations, or else to deposit C precursors from the gas phase on the Si-containing active material and graphite.

Conversion of the Si/G/P Precomposite into an Si/G/C Composite

The conversion of the carbon precursors (P) into inorganic amorphous carbon (C) for producing the Si/G/C composites of the invention is accomplished preferably thermally by anaerobic carbonization.

This operation may take place, for example, in a tube furnace, rotary tube furnace, chamber furnace, muffle furnace, or in a fluidized-bed reactor.

The choice of the type of reactor is guided preferably by whether the desire is to carry out the carbonization statically or with continual mixing of the reaction medium.

The carbonization is carried out at temperatures between 400 and 1400° C., preferably at 500-1000° C., and more preferably at 700-1000° C.

The atmosphere used consists of an inert gas such as nitrogen or argon, preferably of argon, to which further fractions of a reducing gas such as hydrogen may selectively also have been added.

The atmosphere may be located statically above the reaction medium or, preferably, may flow in the form of a gas flow over the reaction mixture.

The flow rates used for this purpose are dependent on the volume of the reactor. For a reactor volume of approximately 10 l, the flow rate is preferably between 0 and 1 l per minute, more preferably 100-600 ml/min, and very preferably 150-300 ml/min.

The heating of the reaction mixture may be carried out with different heating rates of between 1 and 20° C. per minute, preference being given to using heating rates between 1-10° C./min and more preferably 3-5° C./min.

Also possible, moreover, is a staged carbonizing operation with different interim temperatures and interim heating rates.

When the target temperature has been reached, the reaction mixture is conditioned at the temperature for a certain time or cooled immediately. To complete the formation of carbon, holding times of 30 min to 24 h are preferred, more preferably 2-10 h, and very preferably 2-3 h.

Cooling as well may be carried out actively or passively, and also uniformly or in stages.

Since usually a specified particle size is necessary for the further use of the resultant Si/G/C composite powders for electrode preparation, there may be further steps after the carbonization, for mechanical classification and optionally for comminution.

The surface of the resultant Si/G/C composite powders may subsequently be modified in further operating steps, through the application of further C coatings, for example.

The resultant Si/G/C composite powders may be obtained in the form of isolated particles, relatively loose agglomerates, or solid aggregates, individual particles being particularly preferred for application in Li ion batteries.

The Si/G/C particles may be round, splinter-shaped, or present in the form of flakes.

The average primary particle size of the composites is preferably <1 mm, more preferably <100 μm, and very preferably <50 μm.

The silicon-containing active material is present in the Si/G/C composites preferably in the form of isolated particles or agglomerated form, but by no means in aggregated form.

Moreover, the silicon-containing particles may be embedded uniformly in the C matrix (without direct graphite contact) or else may contact the graphite particles.

The amorphous carbon generated from the C precursors may cover the silicon-containing active material and the graphite in the form of a thin layer or may preferably form a C matrix around the graphite core, into which the silicon-containing active material is internally embedded or is present externally on the surface, and also combinations of these configuration possibilities. The C matrix here may be very dense or, preferably, porous. Particularly preferred is a structure in which the silicon is present fully embedded into a porous C matrix on the graphite core.

Both the silicon-containing active material and the carbon in the Si/G/C composite may be crystalline or amorphous, and may also comprise mixtures of crystalline and amorphous constituents.

The Si/G/C composites may have low or else very high specific surface areas (BET), which may be in the range of 10-400 $m^2/g$ (100-250 $m^2/g$ preferred).

The Si/G/C composites of the invention may be present in various chemical compositions.

Generally the Si/G/C composites may have silicon contents of 10-90 wt %, total carbon content (G+C) of 10-90 wt %, and oxygen contents of 0-20 wt %. Preferred compositions are those of 20-50 wt % silicon, 50-80 wt % total carbon content (G+C), and 0-10 wt % oxygen content. Particularly preferred compositions are those of 10-30 wt % silicon, 70-90 wt % total carbon content (G+C), and 0-5 wt % oxygen content.

The carbon fractions may be distributed, according to the composition of the composite, over pure amorphous carbon obtained by carbonization, graphite, optionally conductive carbon black, optionally carbon nanotubes (CNTs), or other carbon modifications. A high graphite fraction is particularly preferred.

Besides the stated major constituents there may also be further chemical elements present in the form of a deliberate addition or incidental impurity: Li, Fe, Al, Cu, Ca, K, Na, S, Cl, Zr, Ti, Pt, Ni, Cr, Sn, Mg, Ag, Co, Zn, B, Sb, Pb, Ge, Bi, rare earths, the amounts thereof being preferably <1 wt % and more preferably <100 ppm.

A further subject of the present invention is the use of the Si/G/C composites of the invention as active electrode material for lithium ion batteries, and an electrode material for a lithium ion battery that comprises Si/G/C composites of the invention.

An electrode material of this kind is used preferably for producing the negative electrode (anode) of a lithium ion battery.

A further subject of the present invention is, therefore, a lithium ion battery having a first electrode as cathode, having a second electrode as an anode, having a separator arranged between the two electrodes, having two connections to the electrodes, having a casing which accommodates the stated parts, and having a lithium ion-containing electrolyte with which both electrodes and the separator are impregnated, the anode comprising an electrode material which comprises the Si/G/C composites of the invention.

The anode is produced by processing the active electrode materials with further components and optionally a solvent, such as water, hexane, toluene, tetrahydrofuran, N-methylpyrrolidone, N-ethylpyrrolidone, acetone, ethyl acetate, dimethyl sulfoxide, dimethylacetamide, or ethanol, or with solvent mixtures, to form an electrode ink or electrode paste.

Processing of the material may be done using, for example, rotor-stator machines, high-energy mills, planetary kneaders, stirred ball mills, shaking tables, or ultrasonic devices.

The term "further components" refers to further materials with the capacity to store lithium ions, such as graphite, lithium, tin, aluminum, silicon oxide, or metal alloys, polymeric binders or binder mixtures, conductive materials, such as conductive carbon black, carbon nanotubes (CNT) or metal powders, and further auxiliaries, such as dispersants or pore formers, for example.

Possible binders are polyvinylidene fluoride, polytetrafluorethylene, polyolefins, or thermoplastic elastomers, especially ethylene/propylene-diene terpolymers.

One particularly preferred embodiment involves modified cellulose as binder, which is processed with water as solvent to form an electrode ink or electrode paste.

The solids content in the ink or paste is preferably between 5 wt % and 95 wt %, more preferably between 10 wt % and 50 wt %.

The electrode ink or paste with the composite materials of the invention is knife-coated preferably onto a copper foil or another current collector, with a dry film thickness of 2 µm to 500 µm, more preferably of 10 µm to 300 µm.

Other coating methods, such as rotational coating (spincoating), dipped coating, painting, or spraying, may also be used.

Prior to the copper foil being coated with the electrode material of the invention, the copper foil may be treated with a commercial primer, based for example on polymer resins. It increases the adhesion to the copper, but itself possesses virtually no electrochemical activity.

The electrode coating is dried to constant weight. The drying temperature is guided by the materials used and by the solvent employed. It lies between 20° C. and 300° C., more preferably between 50° C. and 150° C.

The proportion of the composite material of the invention, based on the dry weight of the electrode coating, is between 5 wt % and 98 wt %, more preferably between 60 wt % and 95 wt %.

Further components of the electrode coating are binders, conductivity additives, and optionally dispersing aids.

The cathode material preferred comprises lithium cobalt oxide, lithium nickel oxide, lithium nickel cobalt oxide (doped and undoped), lithium manganese oxide (spinel), lithium nickel cobalt manganese oxides, lithium nickel manganese oxides, lithium iron phosphate, lithium cobalt phosphate, lithium manganese phosphate, lithium vanadium phosphate, or lithium vanadium oxides.

The separator is a membrane which is permeable only to ions, of the kind which is known in battery manufacture. The separator separates the first electrode from the 15 second electrode.

The electrolyte is a solution of one or more lithium salts (=electrolyte salt) in an aprotonic solvent. Electrolyte salts which can be used are, for example, lithium hexafluorophosphate, lithium hexafluoroarsenate, lithium perchlorate, lithium tetrafluoroborate, $LiCF_3SO_3$, $LiN(CF_3SO_2)$, or lithium borates (especially lithium bis(oxalato)borate (LiBOB) or lithium difluoro(oxalato)borate (LiDFOB)).

The concentration of the electrolyte salt is preferably from 0.5 mol/l up to the solubility limit of the salt in question, but preferably 1 mol/l.

Solvents used may be cyclic carbonates, propylene carbonate, ethylene carbonate, dimethyl carbonate, diethyl carbonate, ethyl methyl carbonate, dimethoxyethane, diethoxyethane, tetrahydrofuran, 2-methyltetrahydrofuran, gamma-butyrolactone, dioxolane, acetonitrile, organic carbonic esters or nitriles, individually or as mixtures thereof.

More preferably the electrolyte includes a film former, such as vinylene carbonate, fluoroethylene carbonate, etc., whereby a significant improvement can be achieved in the cycling stability of the Si composite electrode. This is ascribed primarily to the formation of a solid electrolyte interphase on the surface of active particles. The proportion of the film former in the electrolyte is preferably between 0.1 wt % and 20.0 wt %, more preferably between 0.2 wt % and 15.0 wt %, very preferably between 0.5 wt % and 10 wt %.

Besides the above-described liquid electrolyte systems it is also possible, moreover, for solid electrolytes or gel electrolytes to be used, containing a solid phase of, for example, polyvinylidene fluoride, hexafluoropropylene, polyvinylidene fluoride-hexafluoropropylene copolymer, polyacrylonitrile, polymethyl methacrylate, or polyethylene oxide, and also mixtures of these solid electrolytes and/or these solid phases with the liquid electrolyte phases stated above.

The lithium ion battery of the invention can be produced in all customary forms, in wound, folded, or stacked form.

All of the substances and materials utilized in producing the lithium ion battery of the invention, as described above, are known. The production of the parts of the battery of the invention and their assembly to form the battery of the invention take place in accordance with the methods known within the field of battery manufacture.

BRIEF DESCRIPTION OF THE DRAWINGS

The invention will be described in conjunction with the following drawings, wherein.

INVENTIVE AND COMPARATIVE EXAMPLES

Figure 1:
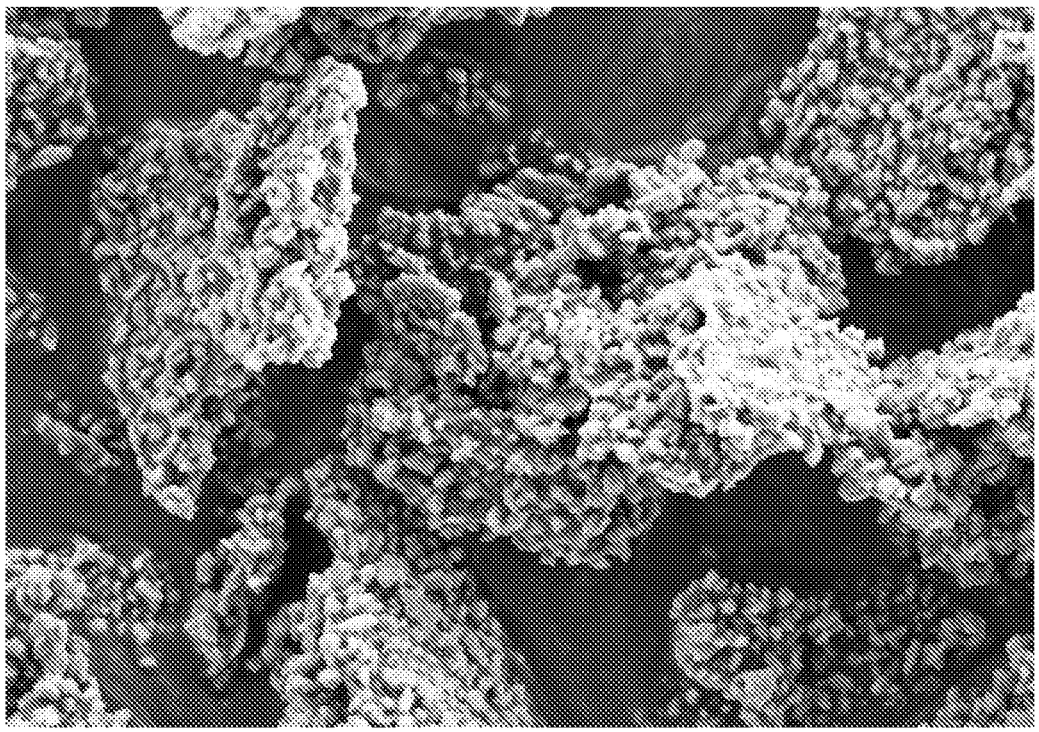
FIG. 1 shows the SEM image of the Si/G/C composite of inventive example 1 (7500 times magnification).

The examples which follow illustrate the methods and the approach when applying this invention, but are not limiting on the scope thereof.

Unless indicated otherwise, the examples below were carried out in an atmosphere of dry argon with a purity of 99,999 vol %, and under a pressure of the surrounding atmosphere of approximately 1013 mbar, and also at room temperature (23° C.). The solvents used for the syntheses were dried by standard methods and stored under a dry argon atmosphere. The methods and materials used in the examples were as follows:

Carbonization

All the carbonizations carried out in the examples were carried out using a 1200° C. three-zone tube furnace (TFZ 12/65/550/E301) from Carbolite GmbH and using a cascade regulation, including a type N probe thermocouple. The stated temperatures relate to the internal temperature of the tube furnace at the location of the thermocouple. Each starting material to be carbonized was weighed out into one or more fused-silica combustion boats (QCS GmbH) and introduced into a working tube made of fused silica (diameter 6 cm; length 83 cm). The settings and operating parameters used for the carbonizations are indicated in the respective examples.

Mechanical Aftertreatment/Milling

The Si/G/C powders obtained after the carbonization were subsequently comminuted further in some cases by milling with a Retsch PM100 planetary ball mill. For this purpose the Si/G/C powder was introduced into a 50 ml milling cup (special steel) together with milling balls (special steel; 10 mm diameter) and milled at a preset rotary speed (300 rpm) for a duration defined in the examples below.

Analytical methods and instruments used for characterizing the resultant Si/G/C composites were as follows:

Scanning Electron Microscopy/Energy-Dispersing X-Ray Spectrometry (SEM/EDX)

The microscopic studies were carried out using a Zeiss Ultra 55 scanning electron microscope and an INCA x-sight energy-dispersive X-ray spectrometer. The samples were vapor-coated with carbon before being analyzed, in order to prevent charging phenomena using a Baltec SCD500 sputter/carbon coating unit.

Transmission Electron Microscopy/Energy-Dispersive X-Ray Spectrometry (TEM/EDX)

The microscopic studies were carried out using a Zeiss Libra 120 transmission microscope and an EDX detector from Oxford Instruments. Prior to analysis, the samples were embedded in Spezifix 20 and analyzed by ultramicrotome section.

Inorganic Analysis/Elemental Analysis

The carbon contents reported in the examples were determined using a Leco CS 230 analyzer, with oxygen contents being determined using a Leco TCH-600 analyzer.

The reported silicon contents in the Si/G/C composites were determined by means of ICP (inductively coupled plasma)-emission spectrometry (Optima 7300 DV, from Perkin Elmer). For this purpose the samples were subjected to acidic digestion ($HF/HNO_3$) in a microwave (Microwave 3000 from Anton Paar). The ICP-OES determination is oriented on ISO 11885 "Water quality—Determination of selected elements by inductively coupled plasma atomic emission spectrometry (ICP-OES) (ISO 11885:2007); German version EN ISO 11885:2009", which is used for the analysis of acidic aqueous solutions (e.g., acidified samples of drinking water, waste water and other waters, aqua regia extracts of soils and sediments).

Particle Size Determination

The particle size distribution was determined for the purposes of this invention in accordance with ISO 13320 by means of static laser scattering with a Horiba LA 950. When preparing the samples in the case of this determination, in particular care must be expended on the dispersing of the particles in the measurement solution, so as not to measure the size of agglomerates instead of individual particles. For the Si/G/C composites investigated here, the particles were dispersed in water. For that purpose the dispersion prior to measuring, as and when required, was treated for 4 minutes with 250 W ultrasound in a Hielscher UIS250v laboratory ultrasound unit with LS24d5 sonotrode.

BET Specific Surface Area

The specific surface area of the Si/G/C composites obtained was determined by the BET method, using the Sorptomatic 1990 instrument.

Thermogravimetric Analysis (TGA)

The ratio of different carbon modifications in a composite (graphite (G) alongside amorphous carbon (C)) was determined by means of thermogravimetric analysis, using a Mettler TGA 851 thermobalance. The measurement was carried out under oxygen as measuring gas in the temperature range of 25-1000° C. and a heating rate of 10° C./min. In the presence of G and C, the loss in mass caused by combustion of the total carbon takes place in two stages in the temperature range of 400-800° C., the C:G ratio reported in the respective examples having been determined from the ratio between these stages.

Materials below were procured from commercial sources or prepared in-house and used directly without further purification: a suspension of silicon nanopowder (NP180—splinter-shaped, nonaggregated Si particles prepared in-house by wet milling in a stirred ball mill D50=180 nm) in ethanol (solids content 22 wt %), silicon nanopowder (aggregated round primary particles with 20-30 nm diameter, produced by Nanostructured & Amorphous Materials; D50=256 nm), graphite KS6L-C (Timcal), methanol (99.0% SeccoSolv; Merck), resorcinol (>99.0%; Sigma-Aldrich), formaldehyde solution (37% in water, stabilized with 10%-15% methanol; Sigma-Aldrich), ammonia solution (32%; Merck)

Inventive Example 1

Si/G/C Composite with Nonaggregated Nanoscale Silicon Particles

Silicon nanopowder suspension (9.00 g; 22 wt % NP180 in ethanol; corresponding to 2.07 g of Si) and graphite (3.00 g; KS6L-C; Timcal) were mixed together with 80 ml of methanol. The resulting suspension was treated for 2×10 min with internal ultrasound (Branson Digital Sonifier 250). Resorcinol (3.20 g) and formaldehyde solution (5.90 g; 37% in water, stabilized with 10% methanol) were added. The pH of the suspension was adjusted to pH=6.5 using 32% ammonia solution (~0.5 ml of ammonia solution).

The reaction mixture was heated with stirring (90° C., 4 h) and then cooled to room temperature.

The solvent mixture was removed under reduced pressure ($3 \cdot 10^{-2}$ mbar, 80° C.). The residue obtained was dried under these conditions for 2 h under reduced pressure.

The black-brown solid was placed into a fused silica boat (QCS GmbH) and carbonized in a three-zone tube furnace (TFZ 12/65/550/E301; Carbolite GmbH) using a cascade regulation, including a type N sample element, with argon as inert gas: initially heating rate 3° C./min, temperature 300° C., hold time 1 h, Ar flow rate 200 ml/min; afterward directly further with heating rate 10° C./min, temperature 700° C., hold time 2 h, Ar flow rate 200 ml/min.

After cooling, 5.25 g were obtained in a black, powdery solid (carbonization yield 83%).

Elemental composition: Si 26.4 wt %, carbon 69.0 wt % (G 40 wt %; C 29 wt %), O 4.6 wt %.

Particle size distribution (static laser light scattering; Horiba LA-950): D10: 2.76 μm, D50: 4.79 μm, D90: 8.35 μm. Here and elsewhere, the D10, D50 and D90 values stand for the 10%, 50% and 90% percentile values of the volume-weighted diameter size distributions of the milled material.

In order to remove oversize >20 μm, the Si/G/C powder was subsequently comminuted further in a planetary ball mill (Retsch PM1000): milling cup and milling balls made from special steel; 12×10 mm balls; rotational speed 300 rpm; 2 h.

Particle size distribution (static laser light scattering; Horiba LA-950): D10: 0.334 μm, D50: 1.15 μm, D90: 5.33 μm.

Specific surface area (BET): 236 $m^2/g$.

Capacity of material (calculated from the elementary composition and the capacities of the elements present) 1119 mAh/g FIG. 1 shows the SEM image of the Si/G/C composite of inventive example 1 (7500 times magnification). The graphite core is covered with nonaggregated Si nanoparticles, which are in turn coated with amorphous carbon.

Inventive Example 2

Production of an Electrode Coating 2.00 g of the composite material with nonaggregated silicon particles according to inventive example 1 and 0.30 g of conductive carbon black (Timcal, Super P Li) were dispersed in 20.0 g of a 1.0 wt % strength solution of sodium carboxymethylcellulose (Daicel, Grade 1380) in water, using a dissolver with a periphery speed of 12 m/s.

After degassing had taken place, the dispersion was applied using a film drawing frame with 0.10 mm slot height (Erichsen, model 360), to a copper foil (Schlenk Metallfolien, SE-Cu58) with thickness of 0.030 mm.

The electrode coating produced in this way was subsequently dried at 80° C. for 60 minutes.

The average capacity of the electrode coating is 895 mAh/g, the average coat weight 0.57 mg/cm$^2$.

Inventive Example 3

Implementation of Electrochemical Studies

The electrochemical studies were carried out on a half cell in a three-electrode arrangement (zero-current potential measurement).

The electrode coating from inventive example 2 was used as the working electrode; lithium foil (Rockwood Lithium, thickness 0.5 mm) was used as reference electrode and counterelectrode. A 6-ply stack of nonwoven fabric (Freudenberg Vliesstoffe, FS2226E), impregnated with 100 μl of electrolyte, served as separator.

The electrolyte used consisted of a 1-molar solution of lithium hexafluorophosphate in a 3:7 (v/v) mixture of ethylene carbonate and diethyl carbonate, to which 2 wt % of vinylene carbonate had been added.

The cell was constructed in a glovebox (<1 ppm $H_2O$, $O_2$); the water content in the dry mass of all the components used was below 20 ppm.

Electrochemical testing was carried out at 20° C.

The potential limits used were 40 mV and 1.0 V vs. Li/Li+.

The charging or lithiation of the electrode took place in a cc/cv (constant current/constant voltage) method at constant current and, after attainment of the voltage limit, at constant voltage until the current went below C/20.

The discharging or delithiation of the electrode took place in a cc (constant current) method with constant current until attainment of the voltage limit. The specific current selected was based on the weight of the electrode coating.

Figure 2:
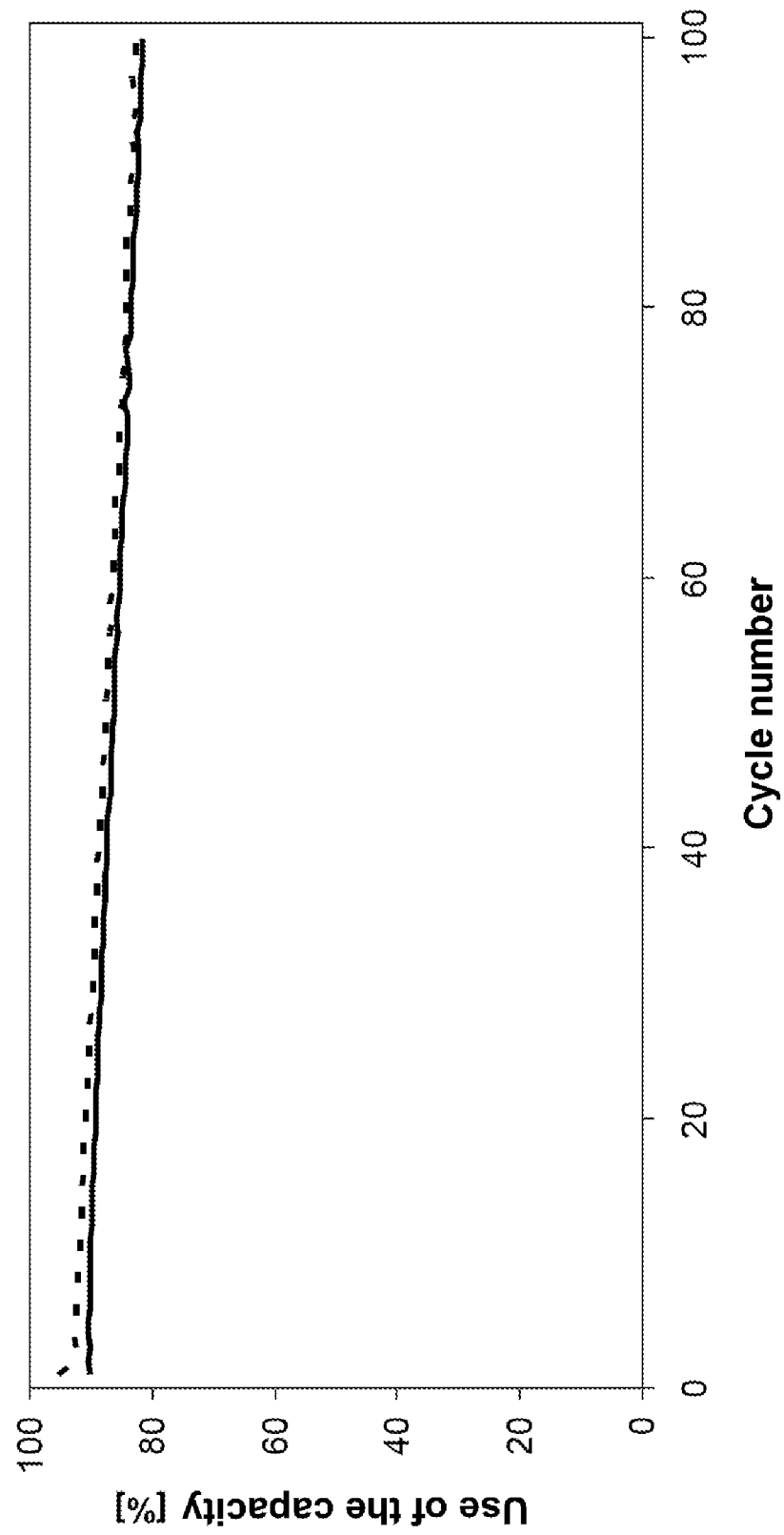
FIG. 2 shows the charging capacity (broken line) and discharging capacity (solid line) of the electrode coating from inventive example 2 as a function of the number of cycles at a current of C/10.

FIG. 2 shows the charging capacity (broken line) and discharging capacity (solid line) of the electrode coating from inventive example 2 as a function of the number of cycles at a current of C/10.

The electrode coating from inventive example 3 exhibits a reversible capacity of about 806 mAh/g, corresponding to a capacity of the composite material from inventive example 1 of 1007 mAh/g and to 90% utilization of the calculated capacity of material in the 1$^{st}$ cycle. After 100 cycles, the capacity retention is around 90% of the capacity from the 1$^{st}$ cycle.

Comparative Example 4

Si/G/C Composite with Aggregated Nanoscale Silicon Particles (not Inventive)

An Si/G/C composite with aggregated nanoscale silicon particles was produced in the same way as for inventive example 1, but replacing the silicon nanopowder suspension of D50=180 nm (NP180, nonaggregated particles) by a dry Si nanopowder composed of aggregated particles (2.00 g; Nanostructure & Amorphous Materials).

After carbonization, 5.86 g of a black, powdery solid were obtained (carbonization yield 82%).

Bound to the graphite surfaces there are structures of aggregated spherical primary particles which are coated in turn with amorphous carbon.

Elemental composition: Si 30.8 wt %, carbon 66.0 wt % (G, 40 wt %; C, 26 wt %), O 3.2 wt %.

Particle size distribution (static laser light scattering; Horiba LA-950): D10: 2.55 μm, D50: 4.31 μm, D90: 6.83 μm.

Specific surface area (BET): 152 m$^2$/g.

Figure 3:
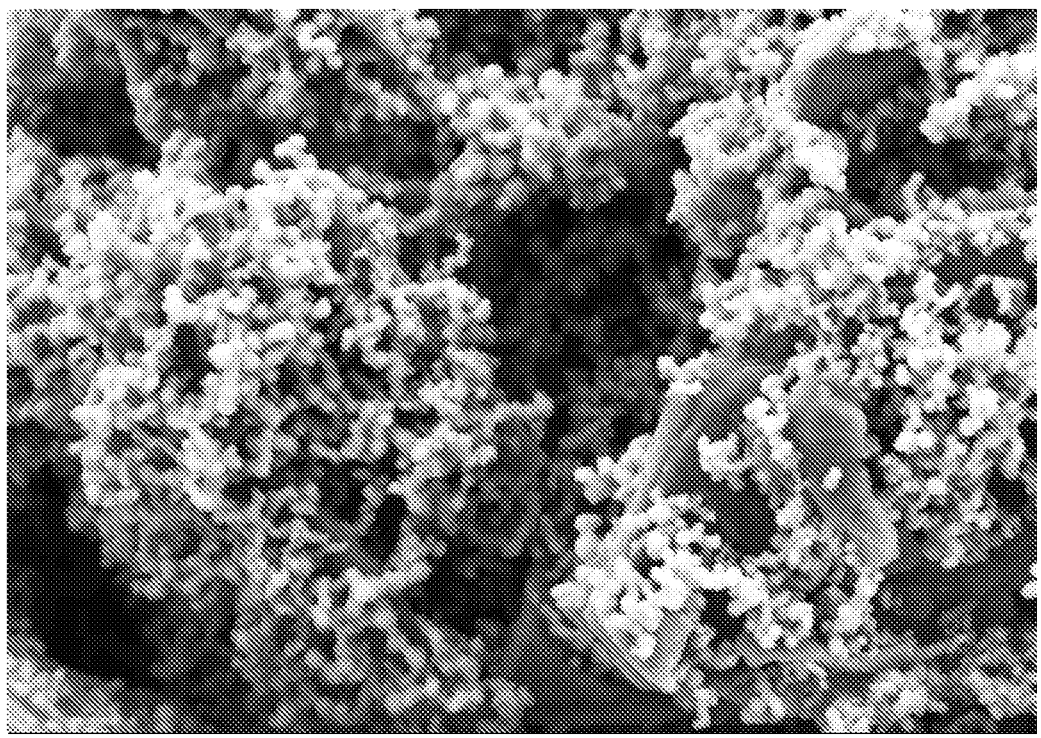
FIG. 3 shows the SEM image of the Si/G/C composite of comparative example 4 (5000 times magnification).

Capacity of Material (Calculated from the Elementary Composition and the Capacities of the Elements Present) 1553 mAh/g FIG. 3 shows the SEM image of the Si/G/C composite of comparative example 4 (5000 times magnification). Clearly apparent are the highly aggregated Si nanoparticles on the graphite core, which are in turn coated with amorphous carbon.

Comparative Example 5

Production of an Electrode Coating (not Inventive)

Comparative example 5 relates to the production and electrochemical characterization of an electrode coating with composite material which comprises aggregated silicon particles.

2.00 g of the composite material with aggregated silicon particles according to comparative example 4 and 0.30 g of conductive carbon black (Timcal, Super P Li) were dispersed in 20.0 g of a 1.0 wt % strength solution of sodium carboxymethylcellulose (Daicel, Grade 1380) in water, using a dissolver with a periphery speed of 12 m/s.

After degassing had taken place, the dispersion was applied using a film drawing frame with 0.10 mm slot height (Erichsen, model 360), to a copper foil (Schlenk Metallfolien, SE-Cu58) with thickness of 0.030 mm.

The electrode coating produced in this way was subsequently dried at 80° C. for 60 minutes.

The average capacity of the electrode coating is 1242 mAh/g, the average coat weight 1.16 mg/cm$^2$.

Comparative Example 6

Implementation of Electrochemical Studies (not Inventive)

The electrode coating with the composite comprising aggregated silicon particles from comparative example 4 was tested as described in inventive example 3.

Figure 4:
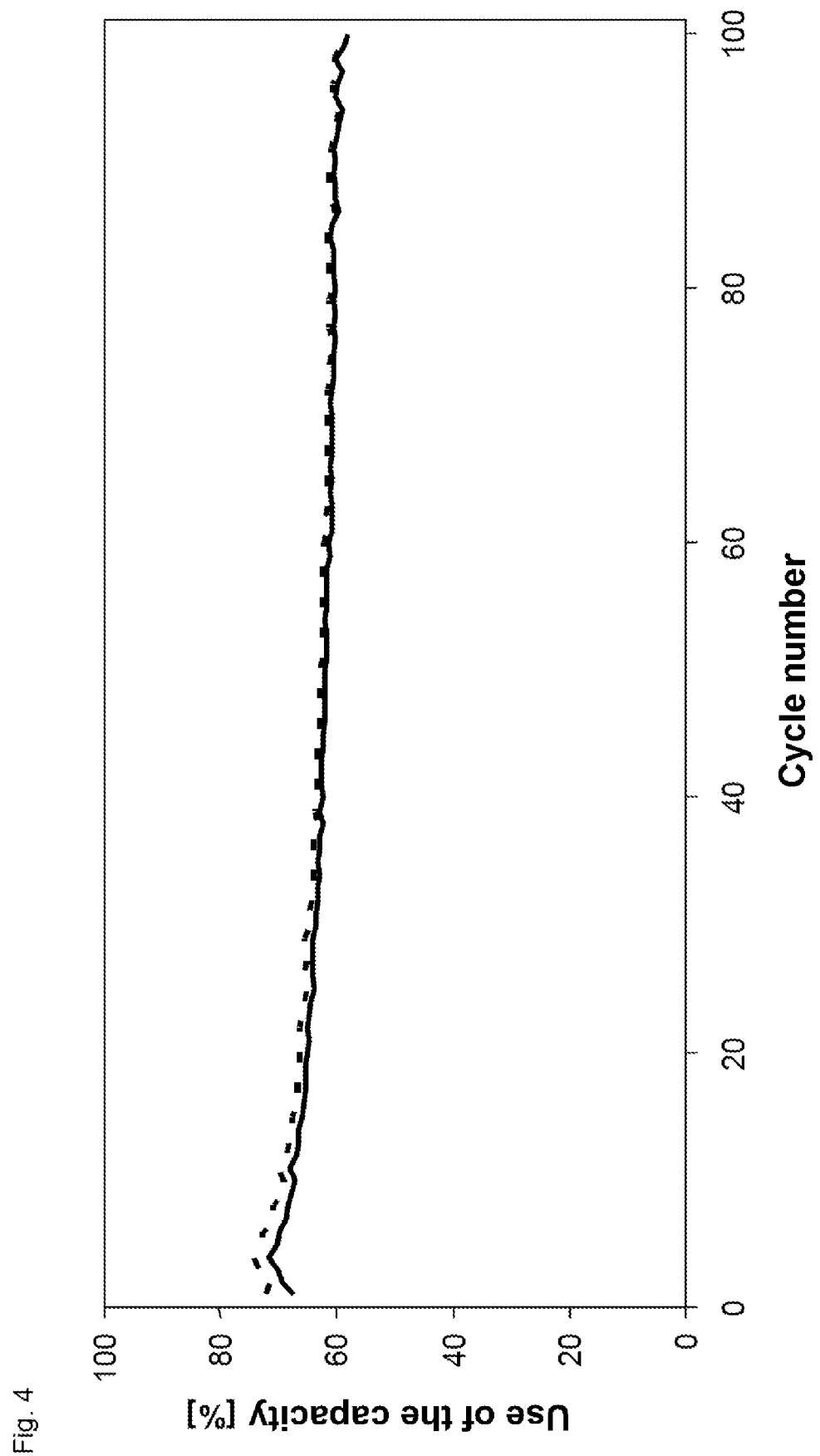
FIG. 4 shows the charging capacity (broken line) and discharging capacity (solid line) of the electrode coating from comparative example 5 as a function of the number of cycles at a current of C/10.

FIG. 4 shows the charging capacity (broken line) and discharging capacity (solid line) of the electrode coating from comparative example 5 as a function of the number of cycles at a current of C/10.

The electrode coating from inventive example 5 exhibits a reversible capacity of about 870 mAh/g, corresponding to a capacity of the composite material from comparative example 4 of 1088 mAh/g and to 70% utilization of the calculated capacity of material in the 1$^{st}$ cycle. After 100 cycles, the capacity retention is around 83% of the capacity from the 1$^{st}$ cycle.

Inventive Example 7

Verification of the Aggregation Stability of Silicon Nanoparticles Under the Temperature Conditions Used in Inventive Example 1

Silicon nanopowder suspensions in ethanol with various particle sizes (D50=100 nm, 150 nm, 200 nm) were freed from the solvent under reduced pressure and dried, and the resultant dry silicon nanopowders were analyzed by differential thermoanalysis (DTA) in the temperature range up to 1500° C.

In all cases, within the bounds of measurement accuracy, the melting point of silicon was measured at ~1400° C.

Consequently, under the selected conditions of processing and carbonization in inventive example 1 (700 to 1400° C.), there is no melting and resulting aggregation of the Si particles.

The invention claimed is:

1. A silicon/graphite/carbon composite (Si/G/C composite), comprising graphite (G) and nonaggregated, nanoscale silicon particles (Si), wherein:
    (a) the silicon particles are embedded in an amorphous carbon matrix (C) as isolated individual silicon particles which are not intergrown with one another to form inseparable aggregates of primary particles;
    (b) the silicon/graphite/carbon composite contains 20-50 wt % of silicon, 50-80 wt % of carbon, and 0-10 wt % of oxygen;
    (c) the silicon/graphite/carbon composite is a core-shell-particle which includes one or more crystalline graphite cores within an Si/C shell;
    (d) the silicon/graphite/carbon composite has a round or a splinterlike form or is in the form of a flake; and
    (e) surfaces of the silicon particles comprise a thin oxide layer or surface functionalities selected from the group consisting of Si—H, Si—Cl, Si—OH, Si—Oalkyl, Si—Oaryl, Si-alkyl, Si-aryl, Si—Osilyl, Si—(CH$_2$)$_n$NR$_2$, Si—(CH$_2$)$_n$OCH$_2$CH(O)CH$_2$, Si—(CH$_2$)$_n$OH, Si—C$_6$H$_4$OH, Si—(CH$_2$)$_n$CN, and Si—(CH$_2$)$_n$NCO, wherein n has a value of from 1 to 10.

2. The silicon/graphite/carbon composite as claimed in claim 1, comprising one or more graphite cores which are provided with an amorphous carbon layer, wherein the amorphous carbon layer forms the amorphous carbon matrix (C) and wherein the silicon particles are embedded in the amorphous carbon layer.

3. The silicon/graphite/carbon composite as claimed in claim 1, further comprising one or more components selected from the group consisting of (conductive) carbon black, amorphous carbon, pyrolytic carbon, soft carbon, hard carbon, carbon nanotubes (CNTs), and fullerenes.

4. The silicon/graphite/carbon composite as claimed in claim 1, which further comprises at least one further active material selected from the group consisting of Li, Sn, Mg, Ag, Co, Ni, Zn, Cu, Ti, B, Sb, Al, Pb, Ge, Bi, and rare earths.

5. The silicon/graphite/carbon composite as claimed in claim 1, wherein the composite is in the form of isolated or individual particles, loose agglomerates, or solid aggregates.

6. The silicon/graphite/carbon composite as claimed in claim 1, wherein an average composite particle size is less than 1 mm.

7. The silicon/graphite/carbon composite as claimed in claim 1, wherein the silicon/graphite/carbon composite consists of: (a) graphite (G), (b) nonaggregated, nanoscale silicon particles (Si) and (c) optionally one or more components selected from the group consisting of (conductive) carbon black, amorphous carbon, pyrolytic carbon, soft carbon, hard carbon, carbon nanotubes (CNTs) and fullerenes, wherein the silicon particles are embedded in the amorphous carbon matrix (C).

8. The silicon/graphite/carbon composite as claimed in claim 1, wherein the silicon/graphite/carbon composite consists of graphite (G) and nonaggregated, nanoscale silicon particles (Si), wherein the silicon particles are embedded in the amorphous carbon matrix (C).

9. The silicon/graphite/carbon (Si/G/C) composite as claimed in claim 1, wherein the nonaggregated, nanoscale Si particles (Si) have an average particle size <400 nm.

10. The silicon/graphite/carbon composite as claimed in claim 1, wherein the silicon/graphite/carbon (Si/G/C) composite is obtained by embedding nonaggregated, nanoscale Si particles (Si) together with graphite (G) into an organic carbon precursor (P), in a first step, and then thermally treating this silicon/graphite/carbon composite (Si/G/C) precomposite, in a second step, in such a way that the organic carbon precursor (P) is converted into amorphous carbon (C), and wherein the organic carbon precursor (P) is a member selected from the group consisting of carbon blacks, graphites, charcoals, cokes, carbon fibers, fullerenes, graphene, methane, ethane, ethylene, acetylene, propane, propylene, butane, butene, pentane, isobutane, hexane, benzene, toluene, styrene, ethylbenzene, diphenylmethane, naphthalene, phenol, cresol, nitrobenzene, chlorobenzene, pyridine, anthracene, phenanthrene, pitches, tars, citric acid, ethanol, propanol, furfuryl alcohol, carbohydrates, phenol-formaldehyde resin, resorcinol-formaldehyde resin, lignin, tannin, polyethylene, polystyrene, polyvinyl chloride, polyvinylidene chloride, polyvinylidene fluoride, polytetrafluorethylene, polyvinyl acetate, polyvinyl alcohol, polyethylene oxide, polyacrylonitrile, polyaniline, polybenzimidazole, polydopamine, polypyrrole, poly-para-phenylene and silicones.

11. A method for producing the silicon/graphite/carbon composite of claim 1, which method comprises:
    (1) providing an Si/G/P precomposite by:
        (a) providing nonaggregated nanoscale silicon particles (Si) having surfaces comprising a thin oxide layer or surface functionalities selected from the group consisting of Si—H, Si—Cl, Si—OH, Si—Oalkyl, Si—Oaryl, Si-alkyl, Si-aryl, Si—Osilyl, Si—(CH$_2$)$_n$NR$_2$, Si—(CH$_2$)$_n$OCH$_2$CH(O)CH$_2$, Si—(CH$_2$)$_n$OH, Si—C$_6$H$_4$OH, and Si—(CH$_2$)$_n$CN, Si—(CH$_2$)$_n$NCO, wherein n has a value of from 1 to 10;
        (b) (i) embedding the nonaggregated nanoscale silicon particles (Si) together with graphite (G) into a precursor matrix comprising an organic carbon precursor (P), or
        (ii) coating nonaggregated nanoscale silicon particles (Si) and graphite (G) with an organic carbon precursor (P); and
    (2) heat-treating the Si/G/P precomposite, so that the organic carbon precursor (P) is converted into amorphous carbon (C) and the silicon/graphite/carbon composite (Si/G/C composite) is formed.

12. The method as claimed in claim 11, wherein the organic carbon precursor (P) is selected from the group consisting of elemental carbon, simple hydrocarbons, polyaromatic hydrocarbons, alcohols, carbohydrates, organic polymers and silicones.

13. The method as claimed in claim 12, wherein the organic carbon precursor (P) is a resorcinol-formaldehyde resin, lignin, or polyacrylonitrile.

14. The method as claimed in claim 11, wherein a Si-containing active material and graphite are dispersed together into a solution of a precursor monomer, and the precursor monomer in solution is polymerized to give the organic carbon precursor (P) in such a way that the Si-containing active material and the graphite are embedded fully in the precursor matrix.

15. The method as claimed in claim 11, wherein the converting of the organic carbon precursor (P) into the amorphous carbon (C) is accomplished thermally by anaerobic carbonization.

16. The method as claimed in claim 11, wherein the organic carbon precursor (P) is a member selected from the group consisting of carbon blacks, graphites, charcoals, cokes, carbon fibers, fullerenes, graphene, methane, ethane, ethylene, acetylene, propane, propylene, butane, butene, pentane, isobutane, hexane, benzene, toluene, styrene, ethylbenzene, diphenylmethane, naphthalene, phenol, cresol, nitrobenzene, chlorobenzene, pyridine, anthracene, phenanthrene, pitches, tars, citric acid, ethanol, propanol, furfuryl alcohol, carbohydrates, phenol-formaldehyde resin, resorcinol-formaldehyde resin, lignin, tannin, polyethylene, polystyrene, polyvinyl chloride, polyvinylidene chloride, polyvinylidene fluoride, polytetrafluorethylene, polyvinyl acetate, polyvinyl alcohol, polyethylene oxide, polyacrylonitrile, polyaniline, polybenzimidazole, polydopamine, polypyrrole, poly-para-phenylene and silicones.

17. An electrode material for lithium ion batteries, comprising the silicon/graphite/carbon composite as claimed in claim 1.

18. A lithium ion battery comprising:
- a first electrode as cathode,
- a second electrode as anode,
- a membrane as separator arranged between the first electrode and the second electrode, two connections to the electrodes,
- a casing which accommodates the first electrode, the second electrode, the membrane and the two connections, and
- an electrolyte which contains lithium ions and with which the two electrodes are impregnated,
- wherein the anode comprises the silicon/graphite/carbon composite as claimed in claim 1.

* * * * *